US006992048B2

(12) United States Patent  
Reddy et al.

(10) Patent No.: US 6,992,048 B2
(45) Date of Patent: *Jan. 31, 2006

(54) METHODS OF GENERATING GAS IN WELL TREATING FLUIDS

(75) Inventors: B. Raghava Reddy, Duncan, OK (US); Krishna M. Ravi, Kingwood, TX (US); Karen Luke, Duncan, OK (US); Rickey L. Morgan, Comanche, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 10/792,999

(22) Filed: Mar. 4, 2004

(65) Prior Publication Data

US 2004/0168801 A1 Sep. 2, 2004

Related U.S. Application Data

(63) Continuation of application No. 10/159,588, filed on May 31, 2002, now Pat. No. 6,722,434.

(51) Int. Cl.
C09K 3/00 (2006.01)

(52) U.S. Cl. .................. 507/202; 507/211; 507/217; 166/309

(58) Field of Classification Search ............... 507/102, 507/202, 110, 115, 211, 217; 166/309
See application file for complete search history.

(56) References Cited

U.S. PATENT DOCUMENTS

| | | | |
|---|---|---|---|
| 3,117,699 A * | 1/1964 | Epstein ........................ 222/389 |
| 3,591,394 A | 7/1971 | Digglemann et al. ......... 106/87 |
| 3,958,638 A | 5/1976 | Johnston ..................... 166/294 |
| 3,977,470 A | 8/1976 | Chang ......................... 166/273 |
| 4,099,912 A * | 7/1978 | Ehrlich .......................... 8/137 |
| 4,121,674 A | 10/1978 | Fischer et al. ................. 175/66 |
| 4,142,909 A | 3/1979 | Gaines ......................... 106/87 |
| 4,201,678 A | 5/1980 | Pye et al. ................. 252/8.5 A |
| 4,219,083 A | 8/1980 | Richardson et al. ........ 166/300 |
| 4,232,741 A | 11/1980 | Richardson et al. ........ 166/281 |
| 4,289,633 A | 9/1981 | Richardson et al. ... 252/8.55 B |
| 4,304,298 A | 12/1981 | Sutton ......................... 166/293 |
| 4,333,764 A | 6/1982 | Richardson .................. 106/87 |
| 4,340,427 A | 7/1982 | Sutton ......................... 106/87 |
| 4,367,093 A | 1/1983 | Burkhalter et al. ........... 106/87 |
| 4,450,010 A * | 5/1984 | Burkhalter et al. .......... 106/673 |
| 4,452,898 A * | 6/1984 | Richardson .................... 436/2 |
| 4,565,578 A | 1/1986 | Sutton et al. .................. 106/87 |
| 4,692,269 A | 9/1987 | Kmiec et al. ................. 252/350 |
| 4,728,675 A * | 3/1988 | Pressman ..................... 521/92 |
| 4,741,401 A | 5/1988 | Walles et al. ................ 166/300 |
| 4,758,003 A * | 7/1988 | Goldstein et al. ............ 277/314 |
| 4,813,484 A | 3/1989 | Hazlett ........................ 166/270 |
| 4,832,123 A | 5/1989 | Abou-Sayed et al. ....... 166/281 |
| 4,844,163 A | 7/1989 | Hazlett et al. ............... 166/270 |
| 4,848,465 A | 7/1989 | Hazlett ........................ 166/270 |
| 4,899,819 A | 2/1990 | Hazlett et al. ............... 166/285 |
| 5,373,901 A | 12/1994 | Norman et al. .............. 166/300 |
| 5,413,178 A | 5/1995 | Walker et al. ............... 166/300 |
| 5,495,891 A | 3/1996 | Sydansk ...................... 166/295 |
| 5,613,558 A | 3/1997 | Dillenbeck, III ............ 166/293 |
| 5,658,380 A | 8/1997 | Dillenbeck, III ............ 106/823 |
| 5,669,446 A | 9/1997 | Walker et al. ............... 166/300 |
| 5,789,352 A | 8/1998 | Carpenter et al. ........... 507/209 |
| 5,950,731 A | 9/1999 | Shuchart et al. ............ 166/300 |
| 5,962,808 A | 10/1999 | Lundstrom .................. 149/19.1 |
| 5,972,103 A | 10/1999 | Mehta et al. ................ 106/728 |
| 5,996,693 A | 12/1999 | Heathman .................... 166/291 |
| 6,035,933 A * | 3/2000 | Khalil et al. ................. 166/263 |
| 6,063,738 A | 5/2000 | Chatterji et al. ............. 507/269 |
| 6,138,760 A | 10/2000 | Lopez et al. ................. 166/300 |
| 6,162,839 A * | 12/2000 | Klauck et al. ................. 521/83 |
| 6,187,720 B1 | 2/2001 | Acker et al. ................. 507/238 |
| 6,209,646 B1 | 4/2001 | Reddy et al. ................ 166/300 |
| 6,270,565 B1 | 8/2001 | Heathman et al. ........... 106/696 |
| 6,354,381 B1 * | 3/2002 | Habeeb et al. ............... 166/400 |
| 6,364,945 B1 | 4/2002 | Chatterji et al. ............. 106/677 |
| 6,419,016 B1 | 7/2002 | Reddy ......................... 166/293 |
| 6,444,316 B1 | 9/2002 | Reddy et al. ................. 428/407 |
| 6,460,632 B1 | 10/2002 | Chatterji et al. ............... 175/66 |
| 6,592,660 B2 | 7/2003 | Nguyen et al. .............. 106/677 |
| 6,605,304 B1 * | 8/2003 | Wellinghoff et al. ........ 424/489 |
| 6,681,857 B2 * | 1/2004 | Habeeb et al. ............... 166/299 |
| 6,715,553 B2 * | 4/2004 | Reddy et al. ................ 166/309 |
| 6,722,434 B2 * | 4/2004 | Reddy et al. ................ 166/292 |
| 2002/0035951 A1 | 3/2002 | Chatterji et al. ............. 106/677 |
| 2004/0110643 A1 | 6/2004 | Zavallos |

OTHER PUBLICATIONS

Paper entitled "Specification for Materials And Testing for Well Cements" by American Petroleum Institute, dated Jul. 1990.

* cited by examiner

*Primary Examiner*—Philip C. Tucker
(74) *Attorney, Agent, or Firm*—Craig W. Roddy; Baker Botts L.L.P.

(57) ABSTRACT

The present invention relates to methods of generating gas in and foaming well treating fluids during pumping of the treating fluids or after the treating fluids are placed in a subterranean zone, or both. A method of the present invention provides a method of making a foamed well fluid that comprises a gas comprising the steps of combining an aqueous fluid, a surfactant, an encapsulated activator, and a gas generating chemical, the gas generating chemical being present in an amount in the range of from about 0.1% to 100% of a water component in the aqueous well fluid; and allowing the gas generating chemical and the encapsulated activator to react so that gas is generated in the aqueous fluid to form a foamed well fluid. Methods of cementing, fracturing, cementing compositions, fracturing fluid compositions, and foamed well fluid compositions also are provided.

28 Claims, No Drawings

METHODS OF GENERATING GAS IN WELL TREATING FLUIDS

CROSS-REFERENCE TO RELATED APPLICATIONS

This application is a continuation of application Ser. No. 10/159,588, entitled Methods of Generating Gas in Well Treating Fluids, filed on May 31, 2002, now Pat. No. 6,722,434 which is hereby incorporated in its entirety by reference.

BACKGROUND OF THE INVENTION

1. Field of the Invention

The present invention relates to methods of generating gas in and foaming well treating fluids during pumping of the treating fluids or after the treating fluids are placed in a subterranean zone, or both.

2. Description of the Prior Art

Foamed treating fluids have heretofore been utilized in a number of oil and gas well applications. Typically, a treating fluid is foamed by combining a mixture of foaming and foam stabilizing surfactants with the treating fluid on the surface followed by injecting gas, typically nitrogen, into the treating fluid containing the foaming and foam stabilizing surfactants as the treating fluid is pumped to the well head and into the well bore. This process allows the treating fluid to have gas concentrations of 1% to 80% by volume of the fluid depending on the downhole pressure and temperature and the amount of gas injected at surface. However, the equipment required for storing the nitrogen in liquid or gaseous form and injecting it into a well treating fluid is very elaborate and expensive. In addition, the equipment is frequently unavailable or cannot be easily transported to well sites due to their remote locations.

In situ gas forming agents have been utilized heretofore in well cement compositions to prevent annular gas migration. For example, surfactant coated finely ground aluminum has been included in cement compositions to generate hydrogen gas in the compositions as they are being pumped down a well bore and after they are placed in the annulus between the walls of the well bore and casing or other pipe string therein. The presence of the gas in the cement compositions prevents formation fluids from entering the cement compositions as the cement compositions develop gel strength. That is, the development of gel strength reduces the ability of a cement composition column to transmit hydrostatic pressure. If the hydrostatic pressure of the cement composition column falls below the formation pore pressure before the cement composition has gained sufficient strength to prevent the entry of formation fluids into the well bore, the fluids enter the well bore and form channels in the cement composition column which remain after the cement composition column sets. The presence of the gas which is generated in the cement composition from the finely ground aluminum increases the volume of the cement composition such that the volume increase generated by the gas equals or slightly exceeds the cement composition volume reduction during the development of gel strength due to fluid loss and/or the cement hydration reaction. The increase in volume and the compressibility produced in the cement composition by the gas allows the cement composition column to resist the entry of formation fluids into the well bore.

Other gas forming agents have also been added to well cement compositions to gasify the compositions. For example, U.S. Pat. No. 4,450,010 issued on May 22, 1984 to Burkhalter et al. discloses a well cementing method and gasified cements useful in carrying out the method. That is, U.S. Pat. No. 4,450,010 discloses a method of cementing in subterranean formations using a gasified cement composition which prevents formation fluids from entering the cement composition column formed in the annulus between the well bore and a pipe string therein. The cement composition includes a nitrogen gas generating material, an oxidizing agent, and a reaction rate control material whereby a quantity of gas is generated in the cement composition to offset the shrinkage in the cement composition column as it develops gel strength and to provide compressibility thereto whereby the entry of formation fluids into the well bore is reduced or prevented. While the methods and cement compositions of the prior art have achieved varying degrees of commercial success, there are needs for improved methods of generating gas in well cement compositions and other well fluids whereby the well fluids can be foamed in situ at various selected times during their use to produce a variety of desired downhole results. The control of the timing of in situ gas generation until after the well fluids are pumped also helps in preventing air-locking of the mechanical pumps used.

A situation where the presence of gas in a cement composition will provide a distinct advantage involves problems associated with high fluid pressure buildup behind cemented casing. Occasionally, drilling fluid and cement spacer fluids are left behind casing during the cementing of the casing in a well bore. When the well is put on production, the formation temperature heats up the trapped drilling and/or spacer fluids causing severe high pressure build ups due to the incompressibility of the fluids which can cause damage to the casing. The presence of a compressible gas behind the casing in drilling fluid and cement spacer fluids, either in the form of a gas pocket or foam, will help sustain the temperature increases without severe pressure buildups.

SUMMARY OF THE INVENTION

The present invention relates to methods of generating gas in and foaming well treating fluids during pumping of the treating fluids or after the treating fluids are placed in a subterranean zone, or both.

In one embodiment, the present invention provides a method of making a foamed well fluid that comprises a gas comprising the steps of combining an aqueous fluid, a surfactant, an encapsulated activator, and a gas generating chemical, the gas generating chemical being present in an amount in the range of from about 0.1% to 100% of a water component in the aqueous well fluid; and allowing the gas generating chemical and the encapsulated activator to react so that gas is generated in the aqueous fluid to form a foamed well fluid.

In one embodiment, the present invention provides a method of cementing in a subterranean zone comprising the steps of providing a cement composition that comprises a hydraulic cement, a water component, a gas generating chemical, and an encapsulated activator; placing the cement composition in a subterranean zone; allowing the gas generating chemical to react so that a gas is generated in the cement composition; and allowing the cement composition to set in the subterranean zone.

A method of fracturing a subterranean zone comprising the steps of providing a fracturing fluid that comprises a water component, a gelling agent, a gas generating chemical, and an encapsulated activator; contacting the subterranean zone with the fracturing fluid at a pressure sufficient to create or enhance at least one fracture therein; allowing the gas generating chemical to react so that generated gas is incorporated in the fracturing fluid; and reducing the viscosity of the fracturing fluid so as to produce a reduced viscosity fracturing fluid.

In one embodiment, the present invention provides a cement composition that comprises a hydraulic cement, a water component, a gas generating chemical, and an encapsulated activator.

In another embodiment, the present invention provides a fracturing fluid that comprises a water component, a gelling agent, a gas generating chemical, and an encapsulated activator.

In one embodiment, the present invention provides a foamed well fluid comprising a gas, the gas being generated by a reaction of a gas generating chemical and an encapsulated activator.

The objects, features and advantages of the present invention will be readily apparent to those skilled in the art upon a reading of the description of preferred embodiments which follows.

DESCRIPTION OF PREFERRED EMBODIMENTS

The present invention provides improved methods of generating gas in and foaming well treating fluids while the treating fluids are being pumped and/or after being placed in a subterranean zone. In accordance with the invention, one or more gas generating chemicals and one or more delayed encapsulated activators are combined with a well treating fluid such as a hydraulic cement slurry, a fracturing fluid or the like. The treating fluid must be alkaline or made alkaline, i.e., the treating fluid must have a pH in the range of from about 10 to about 14.

The gas generating chemicals useful in accordance with this invention primarily generate nitrogen along with small amounts of ammonia depending on the chemical structure of the gas generating chemical and the activating agent. When the gas generating chemical molecule contains amide groups, additional ammonia, carbon dioxide (an acidic gas), and carbon monoxide may be produced. The gas generating chemicals are generally solid materials that liberate gas or gases on their own when they are heated to a temperature in the range of from about 200° F. to about 500° F. without requiring alkaline or oxidizing chemicals. In order to cause the gas generating chemicals to generate gases at particular temperatures and/or times, one or more delayed encapsulated activators having selected release times are combined with the treating fluid containing one or more gas generating chemicals. After the gas generating chemical or chemicals and delayed encapsulated activator or activators have been combined with the treating fluid, the treating fluid is pumped into a subterranean zone to be treated by way of the well bore.

As mentioned, the gas generating chemicals and delayed encapsulated activators can be used to generate gas in and foam a treating fluid at different temperatures and times during pumping and after placement. For example, nitrogen gas can be caused to be produced in an aqueous cement composition while being pumped to foam the composition and provide thixotropy thereto, after being placed in the subterranean zone during the static cement composition gel strength development stage to compensate for cement shrinkage caused by fluid loss, during the cement transition time to prevent the inflow of formation fluids and during setting of the cement to provide resiliency thereto.

Gas generating chemicals which can be utilized in accordance with the methods of the present invention include, but are not limited to, compounds containing hydrazine or azo groups, for example, hydrazine, azodicarbonamide, azobis (isobutyronitrile), p toluene sulfonyl hydrazide, p-toluene sulfonyl semicarbazide, carbohydrazide, p-p' oxybis (benzenesulfonylhydrazide) and mixtures thereof. Additional examples of nitrogen gas generating chemicals which do not contain hydrazine or azo groups and which are also useful in the present invention include, but are not limited to, ammonium salts of organic or inorganic acids, hydroxylamine sulfate, carbamide and mixtures thereof. Of these, azodicarbonamide or carbohydrazide are preferred. The gas generating chemical or chemicals utilized are combined with the well treating fluid in a general amount, depending on the amount of gas desired under downhole conditions, in the range of from about 0.1% to about 10% by weight of the treating fluid, more preferably in an amount in the range of from about 0.3% to about 8% and most preferably about 4%.

The generation of gas from the gas generating chemicals depends on the structure of the gas generating chemicals. When the chemical contains an azo group containing two nitrogens connected by a double bond as in azodicarbonamide, the gas generation is caused either thermally or by reaction with alkaline reagents. The reactions with the azocarbonamide generate ammonia gas and possibly carbon dioxide and release the doubly charged diimide group. The diimide dianion being chemically unstable decomposes to nitrogen gas.

The gas generating chemicals containing hydrazide groups in which the two nitrogen atoms are connected by a single bond as well as connected to one or two hydrogens produce gas upon reaction with an oxidizing agent. It is believed that the oxidizing agent oxidizes the hydrazide group to azo structure. Therefore, hydrazide materials containing two mutually single bonded nitrogens which in turn are also bonded to one or more hydrogens need oxidizing agents for activation. To enhance the water solubility of such materials, alkaline pH is generally required. Occasionally, additional chemicals may be needed to increase the rate of gas production.

Examples of delayed encapsulated activators that can be used include, but are not limited to, alkaline materials such as carbonate, hydroxide and oxide salts of alkali and alkaline earth metals such as lithium, sodium, magnesium and calcium and oxidizing agents such as alkali and alkaline earth metal salts of peroxide, persulfate, perborate, hypochlorite, hypobromite, chlorite, chlorate, iodate, bromate, chloroaurate, arsenate, antimonite and molybate anions. Specific examples of the oxidizing agents include ammonium persulfate, sodium persulfate, potassium persulfate, sodium chlorite, sodium chlorate, hydrogen peroxide, sodium perborate and sodium peroxy carbonate. Other examples of oxidizers which can be used in the present invention are disclosed in U.S. Pat. No. 5,962,808 issued to Landstrom on Oct. 5, 1999 which is incorporated herein by reference thereto. Of the various activators that can be used, sodium or ammonium persulfate and sodium chlorite are preferred. The active amounts of the oxidizing activator or activators included in the well treating fluid in the encapsulated form range from about 2 to about 15 times the weight of the gas generating chemical or chemicals therein, more preferably in an amount of about 4 to about 12 times the weight of the gas generating chemical. The actual amounts of the alkaline material used in the well treating fluid should be sufficient to maintain the pH of the fluid between 10 and 14. The activator or activators used and their amounts are selected for the activator's ability to cause the gas generating chemical or chemicals to generate gas at a particular temperature or range of temperatures. The temperatures at which various activators cause a particular gas generating chemical to produce gas can be readily determined in the laboratory.

The activators can be encapsulated with various materials which delay their reaction with the gas generating chemical or chemicals used. Solid activators can be encapsulated by spray coating a variety of materials thereon. Such coating materials include, but are not limited to, waxes, drying oils such as tung oil and linseed oil, polyurethanes and cross-linked partially hydrolyzed polyacrylics. Of these, cross-linked partially hydrolyzed acrylics are preferred. Because of the oxidizing and corrosive nature of the activators, an additional undercoat of polymeric materials such as styrene butadiene may be deposited on the solid activator particles prior to depositing the slow releasing polymeric coating. This method is particularly suitable for encapsulating hygroscopic alkaline activator materials such as hydroxide salts of lithium, sodium and potassium and is described in detail in co-pending U.S. patent application Ser. No. 09/565,092 filed on May 5, 2000 entitled Encapsulated Chemicals For Use In Controlled Time Release Applications And Methods. The oxidizers are preferably encapsulated with a membrane comprising a partially hydrolyzed acrylic cross-linked with either an aziridine prepolymer or a carbodiimide, the membrane having imperfections through which an aqueous fluid can diffuse. The cross-linked acrylic membrane and its use are disclosed in detail in U.S. Pat. No. 5,373,901 issued to Norman et al. on Dec. 20, 1994 which is incorporated herein by reference thereto. The activators may also be encapsulated in the form of aqueous solutions in a particulate porous solid material which remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters and cross-linked modified starches. Of these, metal oxides, metal salts of alumino-silicates and cross-linked porous synthetic polymeric materials are preferred with precipitated silica being the most preferred. When the activators are alkaline materials, the inorganic porous carriers such as porous silica, alumina, or diatomaceous earth are not preferable since they react with the alkaline materials.

In order to provide additional delay to the oxidizing agent activators encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross linked partially hydrolyzed acrylics. Of these, cross-linked partially hydrolyzed acrylics are preferred. The particulate porous solid materials and their use for encapsulating activators and the like are disclosed in detail in U.S. Pat. No. 6,209,646 B1 issued on Apr. 3, 2001 which is incorporated herein by reference thereto.

A gas production rate enhancing chemical may be used when rapid gas production is desired. Examples of such rate enhancing chemicals which can optionally be used include, but are not limited to, copper salts such as copper sulfate, ethylene diamine tetraacetic acid (EDTA) complexes of copper (2+) salts, iron salts including ferric sulfate or ferric nitrate. When the gas generation from the mixture of a gas generating chemical and an activator does not take place unless the rate enhancing material is present due to low application temperature or the like, the timing of the production of gas can be controlled by using encapsulated rate enhancing materials. The encapsulation methods used to encapsulate the rate enhancing materials are the same as those described above for encapsulating the activator materials.

In addition to the gas generating chemical or chemicals and delayed encapsulated activator or activators, a mixture of foaming and foam stabilizing surfactants can be combined with the treating fluid to facilitate the formation and stabilization of the treating fluid foam produced by the liberation of gas therein. An example of such a mixture of foaming and foam stabilizing surfactants which is preferred for use in accordance with this invention is comprised of an ethoxylated alcohol ether sulfate surfactant, an alkyl or alkene amidopropylbetaine surfactant and an alkyl or alkene amidopropyldimethylamine oxide surfactant. Such a surfactant mixture is described in U.S. Pat. No. 6,063,738 issued to Chatterji et al. on May 16, 2000 which is incorporated herein by reference thereto.

When the treating fluid in which gas is to be generated in accordance with this invention is an alkaline well cement composition, one or more gas generating chemicals as described above are included in the cement composition. Preferably, the gas generating chemicals are selected from the group consisting of azodicarbonamide, carbohydrazide and mixtures thereof. One or more delayed encapsulated activators having selected release times are combined with the cement composition containing the gas generating chemical or chemicals so that the gas generating chemical or chemicals react with one or more delayed encapsulated activators while the cement composition is being pumped and at one or more times after the cement composition has been placed in the subterranean zone to be cemented. After the gas generating chemical or chemicals and delayed encapsulated activator or activators have been combined with the cement composition, the cement composition is pumped into the well bore and into the subterranean zone to be cemented.

The quantity of gas generating chemical or chemicals combined with the cement composition and the number of delayed encapsulated activators having different release times can be selected and included in the cement composition so that gas is formed in the cement composition during one or more of the following stages. During pumping to foam the cement composition and provide thixotropy thereto, after the cement composition is placed in the subterranean zone to be cemented during the static cement composition gel strength development stage to compensate for cement shrinkage due to fluid loss or the like, during the cement composition transition time to prevent the inflow of formation fluid and during the setting of the cement to provide resiliency thereto. The term "cement composition transition time" is used herein to mean the time from when the cement composition column increases in gel strength to the level whereby there is a loss of ability to transmit hydrostatic pressure to when the cement composition sets into a hard impermeable mass.

The hydraulic cement compositions which can be utilized in accordance with the methods of this invention are basically comprised of a hydraulic cement, water present in an amount sufficient to form a slurry, the above described gas generating chemical or chemicals and the above described delayed encapsulated oxidizing agent activator or activators.

A variety of hydraulic cements can be utilized in the cement compositions including those comprised of calcium, aluminum, silicon, oxygen and/or sulfur which set and harden by reaction with water. Such hydraulic cements include Portland cements, pozzolana cements, gypsum cements, aluminous cements and silica cements. Portland cements or their equivalents are generally preferred for use in accordance with the present invention. Portland cements of the types defined and described in the *API Specification For Materials And Testing For Well Cements*, API Specification 10, 5th edition, dated Jul. 1, 1990 of the American Petroleum Institute are particularly suitable. Preferred API Portland cements include classes A, B, C, G and H, with API classes G and H being the most preferred.

The water utilized in the cement compositions can be fresh water, unsaturated aqueous salt solutions such as brine or seawater and saturated aqueous salt solutions. The water is generally present in the cement compositions in an amount sufficient to form a slurry, i.e., an amount in the range of from about 30% to about 100% by weight of hydraulic cement in the compositions, more preferably in an amount in the range of from about 35% to about 60%.

As is well understood by those skilled in the art, the cement compositions of this invention can include a variety of additives for improving or changing the properties of the cement compositions. Examples of such additives include, but are not limited to, set retarding agents, fluid loss control agents, dispersing agents, set accelerating agents and formation conditioning agents.

As mentioned above, another treating fluid which can be utilized in accordance with the methods of this invention is a fracturing fluid for creating, extending and propping fractures in a subterranean zone to stimulate the production of hydrocarbons therefrom. The fracturing fluid utilized is generally a viscous alkaline fracturing fluid which forms the fractures in the subterranean zone and deposits proppant therein. Thereafter, the fracturing fluid breaks into a thin fluid which is produced back to the surface. Gas is generated in the fracturing fluid to facilitate the back flow of the fracturing fluid and its removal from the fractures. In accordance with the methods of this invention, one or more gas generating chemicals and one or more delayed encapsulated activators having selected release times are combined with the fracturing fluid on the surface. Thereafter, the fracturing fluid is pumped into the well bore and into a subterranean zone whereby fractures are formed in the zone. After the formation of the fractures, the fracturing fluid which includes a viscosity breaker reverts to a thin fluid, the pressure exerted on the fractured zone is reduced and gas is generated by the activated gas generating chemical or chemicals therein. The presence of the gas facilitates the back flow of the fracturing fluid from the fractures and its removal from the subterranean zone.

While a variety of fracturing fluids can be utilized, a preferred fracturing fluid for use in accordance with this invention is basically comprised of water, a hydrated galactomannan gelling agent, a retarded cross-linking and buffering composition which cross-links the hydrated galactomannan gelling agent and produces a highly viscous alkaline fluid, a delayed gel breaker for causing the viscous fracturing fluid to break into a thin fluid, one or more of the gas generating chemicals described above and one or more of the delayed encapsulated activators described above.

The water utilized for forming the fracturing fluid can be fresh water, salt water, brine or any other aqueous liquid which does not adversely react with other components of the fracturing fluid.

The galactomannan gelling agents which can be used are the naturally occurring gums and their derivatives such as guar, locust bean, tara, honey locust, tamarind, karaya, tragacanth, carragenan and the like. Of the various galactomannan gelling agents which can be utilized, one or more gelling agents selected from the group of guar and guar derivatives are preferred. Examples of guar derivatives which can be used include hydroxyethylguar, hydroxypropylguar, carboxymethylguar, carboxymethylhydroxyethylguar and carboxymethylhydroxypropylguar. Of these, carboxymethylhydroxypropylguar is the most preferred.

While various cross-linking agents or compositions can be utilized, a retarded cross-linking composition comprised of a liquid solvent, an organotitanate chelate and a borate ion producing compound is generally preferred. Various delayed gel breakers can also be utilized in the fracturing fluids of this invention. A preferred delayed breaker is a mixture of calcium hypochlorite or an alkali metal chlorite or hypochlorite and optionally, an activator such as a copper ion producing compound, e.g., copper EDTA. Such breakers and activators are described in U.S. Pat. No. 5,413,178 issued to Walker et al. on May 9, 1995; U.S. Pat. No. 5,669,446 issued to Walker et al. on Sep. 23, 1997; and U.S. Pat. No. 5,950,731 issued to Suchart et al. on Sep. 14, 1999, the disclosures of which are all incorporated herein by reference thereto.

Thus, an improved method of generating gas in and foaming an alkaline well treating fluid introduced into a subterranean zone penetrated by a well bore is comprised of the following steps: (a) combining one or more gas generating chemicals with a well treating fluid; (b) combining one or more delayed encapsulated activators having selected release times with the well treating fluid containing the gas generating chemicals formed in step (a) so that the one or more gas generating chemicals react with the one or more delayed encapsulated activators and gas and foam are formed in the treating fluid while the treating fluid is being pumped or at one or more times after the treating fluid has been placed in the subterranean zone, or both; and (c) pumping the treating fluid formed in step (b) into the well bore and into the subterranean zone.

An improved method of this invention for generating gas in an alkaline well cement composition introduced into a subterranean zone penetrated by a well bore is comprised of the following steps: (a) combining one or more gas generating chemicals selected from the group consisting of azodicarbonamide, carbohydrazide and mixtures thereof with the cement composition; (b) combining one or more delayed encapsulated oxidizing agent activators having selected release times with the cement composition containing the gas generating chemicals formed in step (a) so that the gas generating chemicals react with the one or more delayed encapsulated oxidizing agent activators and gas is formed in the cement composition while the cement composition is being pumped and at one or more times after the cement composition has been placed in the subterranean zone, the oxidizing agents in the delayed encapsulated oxidizing agent activators having selected release times being selected from the group consisting of alkali and alkaline earth metal salts of peroxide, persulfate, perborate, hypochlorite, hypobromite, chlorate, iodate, bromate, chloroaurate, arsenate, antimonite and molybate 16 anions and (c) pumping the cement composition formed in step (b) into the well bore and into the subterranean zone.

An improved method of generating gas in a viscous alkaline well fracturing fluid which is introduced into a subterranean zone penetrated by a well bore, which forms fractures in the subterranean zone and then breaks into a thin fluid comprises the steps of: (a) combining one or more gas generating chemicals with the fracturing fluid; (b) combining one or more delayed encapsulated activators having selected release times with the fracturing fluid containing the gas generating chemicals formed in step (a) so that the gas generating chemicals react with the delayed encapsulated activators and gas is formed in the fracturing fluid after fractures have been formed in the subterranean zone and during and after the fracturing fluid breaks into a thin fluid whereby the gas facilitates the back flow of the fracturing fluid and its removal from the fractures; and (c) pumping the fracturing fluid formed in step (b) into the well bore and into the subterranean zone.

In order to further illustrate the methods of the present invention, the following example is given. This example should not be used improperly to limit or define the invention.

EXAMPLE

A cement slurry was prepared by mixing 748 grams of API Class G cement, 336 grams of deionized water, 7.5 grams of bentonite of clay, 1.5 grams of carboxymethylhydroxyethyl cellulose, 3.0 grams lignosulfonate retarder and 36.3 grams of ammonium persulfate in a Waring blender according to API Specifications. A foaming and foam stabilizing surfactant was hand mixed into the slurry followed by 3.0 grams of toluenesulfonyl hydrazide. The calculated density of the slurry was 15.80 pounds per gallon. The gas evolution with concurrent foaming of the slurry was instantaneous. The slurry was allowed to expand for 420 minutes. As shown in Table I below, the slurry density measured at the end of this period was found to be 3.39 pounds per gallon. The percent of nitrogen formed was calculated to be 78.3% by volume of the slurry.

In a second experiment, 45.4 grams of encapsulated ammonium persulfate with 80% active content were used in place of the non-encapsulated ammonium persulfate used in the first experiment. 100 cc of the cement slurry described in the first experiment except for the change described herein were added to a graduated cylinder and the volume increase of the slurry was measured over time. This experiment was conducted as described in the first experiment. The results are also presented in Table 1 below.

In a third experiment, a sample of encapsulated ammonium persulfate (59.5 grams) with 60% active content was used in place of the non-encapsulated ammonium persulfate used in the first experiment. The encapsulated material used in this experiment had a higher polymer coating and was designed to release the encapsulated material more slowly than that used in the second experiment. This experiment was also conducted as described in the first experiment. The volume increase of the slurry over time is also presented in Table 1 below.

In a fourth experiment, the toluenesulfonyl hydrazide used in the first experiment was replaced by 5.6 grams of carbohydrazide and the amount of non-encapsulated ammonium persulfate was decreased to 28 grams. This experiment was also conducted as described in the first experiment. The gas evolution was again found to be instantaneous. As shown in Table 2, the set cement density at the end of 18 hrs. was 3.89 pounds per gallon, which corresponded to the presence of 75% nitrogen gas.

In a fifth experiment, the non-encapsulated ammonium persulfate used in the fourth experiment was replaced by 34.8 grams encapsulated ammonium persulfate with 80% active component. This experiment was also conducted as described in the first experiment. The cement density measured at the end of 18 hrs. was 14.12 pounds per gallon. The volume increase of the slurry over time is presented in Table 2 below.

In a sixth experiment, the non-encapsulated ammonium persulfate used in the fourth experiment was replaced by 45.8 grams of encapsulated ammonium persulfate with 60% active component. This experiment was also conducted as described in the first experiment. The final density at the end of 18 hrs. was 14.62 pounds per gallons. The volume increase of the slurry over time is given in Table 2 below.

TABLE 1

| Time In Minutes | Ammonium Persulfate (non-encapsulated), 5.0% by weight of cement Volume | Encapsulated Ammonium Persulfate I[1], 6.25% by weight of cement Volume | Encapsulated Ammonium Persulfate II[2], 8.33% by weight of cement Volume |
|---|---|---|---|
| 0 | Instantaneous[3] | 100 ml | 100 ml |
| 5 | " | 105 ml | 100 ml |
| 10 | " | 106 ml | 100 ml |
| 15 | " | 108 ml | 100 ml |
| 30 | " | 130 ml | 100 ml |
| 60 | " | 138 ml | 101 ml |
| 90 | " | 176 ml | 104 ml |
| 120 | " | 176 ml | 106 ml |
| 150 | " | 176 ml | 110 ml |
| 180 | " | 176 ml | 114 ml |
| 210 | " | 176 ml | 128 ml |
| 240 | " | 176 ml | 130 ml |
| 300 | " | 176 ml | 140 ml |
| 360 | " | 176 ml | 148 ml |
| 420 | " | 176 ml | 150 ml |
| Slurry Density @ 420 minutes | 3.39 lb/gal (after foaming) | 11.49 lb/gal | 11.9 lb/gal |

[1]80% active ammonium persulfate content
[2]60% active ammonium persulfate content
[3]The gas evolution was complete in less than a minute

TABLE 2

| Time In Minutes | Ammonium Persulfate (non-encapsulated), 3.75% by weight of cement Volume | Encapsulated Ammonium Persulfate I[1], 4.69% by weight of cement Volume | Encapsulated Ammonium Persulfate II[2], 8.33% by weight of cement Volume |
|---|---|---|---|
| 0 | Instantaneous[3] | 100 ml | 100 ml |
| 5 | " | 102 ml | 100 ml |
| 10 | " | 104 ml | 100 ml |
| 15 | " | 106 ml | 100 ml |
| 30 | " | 120 ml | 100 ml |
| 60 | " | 166 ml | 100 ml |
| 90 | " | 180 ml | 102 ml |
| 120 | " | 180 ml | 102 ml |
| 18 hrs. | " | 180 ml | 160 ml |
| Ultimate Density @ 18 hrs. | 3.89 lb/gal (after foaming) | 14.12 lb/gal (base) | 14.62 lb/gal (base) |

[1]80% active ammonium persulfate content
[2]60% active ammonium persulfate content
[3]The gas evolution was complete in less than a minute The results in Tables 1 and 2 show that the nitrogen gas generation can be delayed by controlling the release of the oxidizing agent into the cement slurry. The desired rate of gas generation can be accomplished by controlling the amount of the encapsulating coating.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of making a foamed well fluid that comprises a gas comprising the steps of:
    combining an aqueous fluid, a surfactant, a delayed encapsulated activator, a proppant material, and a gas generating chemical, the gas generating chemical being present in an amount in the range of from about 0.1% to 100% of a water component in the aqueous fluid; and
    allowing the gas generating chemical and the delayed encapsulated activator to react so that gas is generated in the aqueous fluid to form a foamed well fluid.

2. The method of claim 1 wherein the aqueous fluid is a viscous alkaline fluid.

3. The method of claim 1 wherein the aqueous fluid is an acidic fluid.

4. The method of claim 1 further comprising the step of using the foamed well fluid in a subterranean operation.

5. The method of claim 4 wherein the subterranean operation involves cementing or fracturing a chosen subterranean zone.

6. A well treatment fluid that comprises a water component, a gelling agent, a proppant material, a gas generating chemical, and a delayed encapsulated activator.

7. The well treatment fluid of claim 6 wherein the gelling agent comprises a cross-linked gelling agent.

8. The well treatment fluid of claim 6 wherein the gelling agent comprises a retarded crosslinking composition that comprises a solvent, an organotitanate chelate, and a borate ion producing compound.

9. The well treatment fluid of claim 6 wherein the well treatment fluid further comprises a crosslinking agent.

10. The well treatment fluid of claim 6 wherein the gelling agent comprises a galactomannan gelling agent.

11. The well treatment fluid of claim 6 wherein the gelling agent comprises hydroxyethylguar, hydroxypropylguar, carboxymethylguar, carboxymethylhydroxyethylguar, or carboxymethylhydroxypropylguar.

12. The well treatment fluid of claim 6 wherein the well treatment fluid further comprises a delayed gel breaker.

13. The well treatment fluid of claim 6 wherein the gas generating chemical comprises a hydrazine or an azo group, azodicarbonamide, azobis(isobutyronitrile), p-toluene sulfonyl hydrazide, p-toluene sulfonyl semicarbazide, carbohydrazide, p-p'-oxybis(benzenesulfonylhydrazide), an ammonium salt of an organic acid, an ammonium salt of an inorganic acid, hydroxylamine sulfate, carbamide, or a mixture thereof.

14. The well treatment fluid of claim 6 wherein the gas generating chemical is present in the well treatment fluid in an amount in the range of from about 0.1% to about 10% by weight of the well treatment fluid.

15. The well treatment fluid of claim 6 wherein the delayed encapsulated activator comprises an alkaline material, an oxidizing agent, a carbonate, a hydroxide salt of an alkali earth metal, a hydroxide salt of an alkaline earth metal, an oxide salt of an alkali earth metal, an oxide salt of an alkaline earth metal, an alkali earth metal salt of a peroxide, an alkali earth metal salt of a persulfate, an alkali earth metal salt of a perborate, an alkali earth metal salt of a hypochlorite, an alkali earth metal salt of a hypobromite, an alkaline earth metal salt of a peroxide, an alkaline earth metal salt of a persulfate, an alkaline earth metal salt of a perborate, an alkaline earth metal salt of a hypochlorite, an alkaline earth metal salt of a hypobromite, ammonium persulfate, sodium persulfate, potassium persulfate, sodium chlorite, sodium chlorate, hydrogen peroxide, sodium perborate, or sodium peroxy carbonate.

16. The well treatment fluid of claim 6 wherein the delayed encapsulated activator comprises a coating material that comprises a wax, a drying oil, or a polymeric material.

17. The well treatment fluid of claim 6 wherein the delayed encapsulated activator comprises a membrane that has at least one imperfection through which an aqueous fluid may diffuse.

18. The well treatment fluid of claim 6 wherein at least a portion of the delayed encapsulated activator is in the form of an aqueous solution on porous solid particulates that comprise a diatomaceous earth material, a zeolite, silica, alumina, a metal salt of an alumino-silicate, a clay, hydrotalcite, a styrene-divinylbenzene based material, a cross-linked polyalkylacrylate ester, or a cross-linked modified starch.

19. The well treatment fluid of claim 6 wherein the well treatment fluid further comprises a gas production rate enhancing chemical.

20. The well treatment fluid of claim 6 wherein the water comprises fresh water, salt water, or, brine.

21. A foamed well fluid comprising a proppant material and a gas, the gas being generated by a reaction of a gas generating chemical and a delayed encapsulated activator.

22. The foamed well fluid of claim 21 wherein the gas generating chemical comprises a hydrazine or an azo group, azodicarbonamide, azobis(isobutyronitrile), p-toluene sulfonyl hydrazide, p-toluene sulfonyl semicarbazide, carbohydrazide, p-p'-oxybis (benzenesulfonylhydrazide), an ammonium salt of an organic acid, an ammonium salt of an inorganic acid, hydroxylamine sulfate, carbamide, or a mixture thereof.

23. The foamed well fluid of claim 21 wherein the delayed encapsulated activator comprises an alkaline material, an oxidizing agent, a carbonate, a hydroxide salt of an alkali earth metal, a hydroxide salt of an alkaline earth metal, an oxide salt of an alkali earth metal, an oxide salt of an alkaline earth metal, an alkali earth metal salt of a peroxide, an alkali earth metal salt of a persulfate, an alkali earth metal salt of a perborate, an alkali earth metal salt of a hypochlorite, an alkali earth metal salt of a hypobromite, an alkaline earth metal salt of a peroxide, an alkaline earth metal salt of a persulfate, an alkaline earth metal salt of a perborate, an alkaline earth metal salt of a hypochlorite, an alkaline earth metal salt of a hypobromite, ammonium persulfate, sodium persulfate, potassium persulfate, sodium chlorite, sodium chlorate, hydrogen peroxide, sodium perborate, or sodium peroxy carbonate.

24. The foamed well fluid of claim 21 wherein the delayed encapsulated activator comprises a coating material that comprises a wax, a drying oil, or a polymeric material.

25. The foamed well fluid of claim 21 wherein the delayed encapsulated activator comprises a membrane that has at least one imperfection through which an aqueous fluid may diffuse.

26. The foamed well fluid of claim 21 wherein at least a portion of the delayed encapsulated activator is in the form of an aqueous solution on porous solid particulates that comprise a diatomaceous earth material, a zeolite, silica, alumina, a metal salt of an alumino-silicate, a clay, hydrotalcite, a styrene-divinylbenzene based material, a cross-linked polyalkylacrylate ester, or a cross-linked modified starch.

27. The foamed well fluid of claim 21 wherein the foamed well fluid is a cement composition.

28. The foamed well fluid of claim 21 wherein the foamed well fluid is a fracturing fluid.

* * * * *